United States Patent
Sasaki et al.

(10) Patent No.: US 6,559,085 B1
(45) Date of Patent: May 6, 2003

(54) METHOD FOR REGENERATING MOLYBDENUM-CONTAINING OXIDE FLUIDIZED-BED CATALYST

(75) Inventors: Yutaka Sasaki, Yokohama (JP); Kunio Mori, Yokohama (JP); Yoshimi Nakamura, Yokohama (JP); Akimitsu Morii, Yokohama (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 0 days.

(21) Appl. No.: 09/700,216

(22) PCT Filed: May 11, 1999

(86) PCT No.: PCT/JP99/02432

§ 371 (c)(1),
(2), (4) Date: Nov. 13, 2000

(87) PCT Pub. No.: WO99/58241

PCT Pub. Date: Nov. 18, 1999

(30) Foreign Application Priority Data

May 12, 1998 (JP) ............................................. 10-145152

(51) Int. Cl.⁷ .......................... B01J 20/34; B01J 38/48; B01J 38/46; B01J 38/60; B01J 23/00
(52) U.S. Cl. ..................... 502/22; 502/24; 502/25; 502/27; 502/316; 502/321
(58) Field of Search ........................... 502/22, 24, 25, 502/27, 316, 321

(56) References Cited

U.S. PATENT DOCUMENTS

| | | | |
|---|---|---|---|
| 2,904,580 A | 9/1959 | Idol | |
| 3,226,422 A | 12/1965 | Sennewald et al. | |
| 3,833,638 A * | 9/1974 | Knox et al. | 260/465.3 |
| 3,882,159 A * | 5/1975 | Callahan et al. | 260/465.3 |
| 4,052,332 A | 10/1977 | D'Amore et al. | |
| 4,052,333 A * | 10/1977 | Lee | 252/416 |
| 4,330,429 A * | 5/1982 | Sasaki et al. | 252/413 |
| 4,419,267 A * | 12/1983 | Sasaki et al. | 502/26 |
| 4,425,255 A * | 1/1984 | Toyoda et al. | 502/38 |
| 4,471,062 A * | 9/1984 | Farrington et al. | 502/34 |
| 4,604,370 A * | 8/1986 | Sarumaru et al. | 502/38 |
| 4,609,635 A | 9/1986 | Canavesi et al. | |
| 4,709,071 A * | 11/1987 | Sasaki et al. | 558/322 |
| 4,757,038 A * | 7/1988 | Sasaki et al. | 502/20 |
| 4,774,352 A * | 9/1988 | Sasaki et al. | 558/322 |
| 5,059,573 A * | 10/1991 | Sasaki et al. | 502/205 |
| 5,071,814 A * | 12/1991 | Sasaki et al. | 502/205 |
| 5,132,269 A | 7/1992 | Sasaki et al. | |
| 5,134,105 A | 7/1992 | Paparizos et al. | |
| 5,324,695 A * | 6/1994 | Karrer et al. | 502/27 |
| 5,378,668 A * | 1/1995 | Beuke et al. | 502/20 |
| 5,663,113 A | 9/1997 | Midorikawa et al. | |
| 6,037,290 A * | 3/2000 | Wachs et al. | 502/34 |

FOREIGN PATENT DOCUMENTS

| | | |
|---|---|---|
| EP | 0 043 684 A1 | 1/1982 |
| GB | 1 319 190 | 6/1973 |
| JP | 57-15842 | 1/1982 |
| JP | 4-227072 | 8/1992 |

* cited by examiner

*Primary Examiner*—Stanley S. Silverman
*Assistant Examiner*—Cam N. Nguyen
(74) *Attorney, Agent, or Firm*—Fitch Even Tabin & Flannery

(57) ABSTRACT

A method for regeneration of a molybdenum-containing oxide fluidized bed catalyst which comprises impregnating a fluidized catalyst of a metal oxide containing molybdenum, bismuth and iron which has been deteriorated by being used for a reaction in production of acrylonitrile by ammoxidation of propylene, with a solution of a molybdenum compound and a solution of at least one compound containing at least one element selected from the group consisting of iron, chromium, lanthanum and cerium which are prepared separately or with a previously prepared mixed solution of the above compounds, drying the resulting catalyst and, then, firing the catalyst at a temperature of 500–700° C.

5 Claims, No Drawings

METHOD FOR REGENERATING MOLYBDENUM-CONTAINING OXIDE FLUIDIZED-BED CATALYST

This application is the national phase of international application PCT/JP99/02432 filed May 11, 1999 which designated the U.S.

TECHNICAL FIELD

The present invention relates to a method for regeneration of molybdenum-containing oxide fluidized bed catalysts deteriorated in activity which have been used for ammoxidation reaction of propylene.

PRIOR ART

It is known to use molybdenum-containing oxide catalysts for ammoxidation reaction of propylene, and, as examples thereof, mention may be made of molybdenum-bismuth-containing catalysts disclosed in U.S. Pat. No. 2,904,580, molybdenum.bismuth.iron-containing catalysts disclosed in U.S. Pat. No. 3,226,422, catalysts containing molybdenum.bismuth.iron.cobalt.nickel, etc. disclosed in GB-A-1,319,190, and catalysts containing further multiple components disclosed in U.S. Pat. Nos. 5,132,269, 5,134,105 and 5,663,113. However, it is known that these catalysts sometimes deteriorate in activity owing to use in long-term reaction or setting of improper reaction conditions.

Various attempts have been made on regeneration of catalysts deteriorated in activity due to the use in reactions. For example, U.S. Pat. No. 4,425,255 proposes a method which comprises heat treating a deteriorated molybdenum-containing catalyst at 200–700° C. in a reducing gas and then calcining the catalyst at 500–700° C. in an oxygen-containing gas; U.S. Pat. No. 4,052,332 discloses a method which comprises impregnating a deteriorated K.Co.Ni.Fe.Bi.P.Mo-containing catalyst with Bi.Mo components and calcining the resulting catalyst; and U.S. Pat. No. 4,609,635 discloses a method which comprises impregnating a deteriorated catalyst containing Mo.Bi.P.Fe.Co.Ni-alkali metal with an aqueous molybdate solution, drying the resulting catalyst and then calcining the catalyst at 250–450° C. However, these proposed methods are complicated in regeneration operation and insufficient in recovery of the catalyst performance, and, thus, still have many problems to be solved. These are industrially important tasks to be solved.

DISCLOSURE OF THE INVENTION

The present invention provides a method of effective reactivation of molybdenum-containing oxide catalysts deteriorated in activity due to being used in reactions, which has been an industrial important task to be solved as mentioned above.

As a result of an intensive research conducted by the inventors in an attempt to solve the above problems, it has been found that when a deteriorated catalyst is impregnated with a solution of a molybdenum compound and a solution of a compound of a specific element or a mixture of these solutions, and the resulting catalyst is dried and then calcined at a specific temperature, the catalyst performance is improved to a performance equal to or higher than that of a fresh catalyst. Thus, the present invention has been accomplished.

That is, the present invention relates to a method for regeneration of a molybdenum-containing oxide fluidized bed catalyst which comprises impregnating a fluidized bed catalyst of a metal oxide containing molybdenum, bismuth and iron which has been deteriorated due to being used for a reaction in production of acrylonitrile by ammoxidation of propylene, with a solution of a molybdenum compound and a solution of at least one compound containing at least one element selected from the group consisting of iron, chromium, lanthanum and cerium which are prepared separately or with a previously prepared mixed solution of the above compounds, drying the resulting catalyst and, then, calcining the catalyst at a temperature of 500–700° C.

BEST MODE FOR CARRYING OUT THE INVENTION

The molybdenum-containing oxide catalysts for fluidized bed to which the method of the present invention can be applied are catalysts containing molybdenum, bismuth and iron which have been deteriorated due to being used for reactions.

The method of the present invention is particularly effective for regeneration or reactivation of oxide catalysts for fluidized bed which have the following composition.

$Mo_{10}Bi_aFe_bSb_cD_dE_eF_fG_gH_hO_i (SiO_2)_j$

In the above formula, Mo, Bi, Fe and Sb represent molybdenum, bismuth, iron and antimony, respectively, D represents at least one element selected from the group consisting of magnesium, calcium, strontium, barium, chromium, manganese, cobalt, nickel and zinc, E represents at least one element selected from the group consisting of copper, silver, cadmium, aluminum, gallium, indium, germanium, tin, lead, titanium, zirconium and hafnium, F represents at least one element selected from the group consisting of vanadium, niobium, tantalum, tungsten, yttrium, lanthanum, cerium, praseodymium, neodymium, samarium, europium, gadolinium, thorium, uranium, rhenium, ruthenium, osmium, rhodium, iridium, palladium, platinum and gold, G represents at least one element selected from the group consisting of phosphorus, boron and tellurium, H represents at least one element selected from the group consisting of lithium, sodium, potassium, rubidium and cesium, O represents oxygen and Si represents silicon, the suffixes a, b, c, d, e, f, g, h, i and j represent an atomic ratio, and in the case of Mo=10, a=0.1–5, b=0.1–15, c=0–20, d=0–10, e=0–10, f=0–5, g=0–5, h=0–3, i is the number of oxygen corresponding to an oxide produced by bonding of the above respective components, and j=20–150.

It is preferred that the catalyst before subjected to regeneration (deteriorated catalyst), the catalyst after subjected to regeneration by the method of the present invention and the catalyst just after preparation are all in the range of the above composition.

The regeneration treatment of the deteriorated catalyst according to the present invention is carried out by impregnating the catalyst separately or simultaneously with a solution containing the molybdenum component and at least one solution containing at least one element selected from iron, chromium, lanthanum and cerium which are individually prepared or with a previously prepared mixed solution of them and, then, calcining the resulting catalyst. If necessary, the impregnation can be carried out in parts in a plurality of times. It has been found that such regeneration treatment can modify the deteriorated catalysts into catalysts having a performance superior to that of fresh catalysts.

When the catalyst is impregnated with molybdenum and other components, the composition of the impregnation elements in atomic ratio is $Mo_1A_aB_bC_c$ wherein A is at least one element selected from the group consisting of phosphorus, boron, tellurium and bismuth, B is at least one element selected from the group consisting of iron, chromium zirconium, lanthanum and cerium, and C is at least one element selected from the group consisting of magnesium, manganese, nickel and cobalt, a=0–1, b=0.03–1, preferably b=0.05–0.8 and c=0–1, and molybdenum to be impregnated is 0.01–2 in atomic ratio when molybdenum in the catalyst is assumed to be 10 in atomic ratio. If amounts of the impregnation components exceed the above range, this is not preferred from the activity of the catalyst because yield of the desired product decreases. Especially, when the amount of the molybdenum component is large, deterioration in properties is also caused, for example, sticking, solidification or the like occurs at the time of preparation of the catalyst or molybdenum scale is generated at the reaction. In the case of impregnation with molybdenum alone, both the selectivity and the reaction rate are not sufficiently improved. In the case of addition of only the B component, rather, decrease of selectivity and reduction of reaction rate are caused. It is considered. that by the addition of both the molybdenum and the B component, the synergistic effect in improvement of performance is exhibited. If the ratio of the B component to molybdenum is less than 0.03 (atomic ratio), recovery or development of the catalytic performance is insufficient, and if it exceeds 1, deterioration of the catalytic performance is caused, for example, yield of the desired product rather decreases. The A and C components are added depending on the purpose, such as for control of reaction rate or inhibition of production of by-products.

To the impregnating solution in the method of the present invention, if necessary, there may be added in a small amount other components than molybdenum and the A, B and C components, such as sodium, potassium, rubidium, cesium, yttrium, praseodymium, neodymium, samarium, vanadium, niobium, tungsten, copper, silver, and zinc.

As starting materials used for preparation of the impregnating solutions in the method of the present invention, there may be used ammonium molybdate, peroxymolybdic acid and/or an ammonium salt thereof, phosphorusmolybdic acid, silicomolybdic acid, etc. as the starting materials for the molybdenum component. Especially, peroxymolybdic acid and/or a salt thereof which are prepared from molybdic acid or a salt thereof and hydrogen peroxide produce stable mixed solutions with many compounds and therefore use of them is convenient. If it is difficult to prepare a stable mixed solution, solutions of the compounds of the respective component elements are prepared and the impregnation operation may be successively repeated using them.

As the starting materials for the A, B and C components, it is convenient to use water-soluble compounds such as orthophosphoric acid for phosphorus, boric acid for boron, and telluric acid for tellurium, and nitrates of bismuth, iron, chromium, zirconium and cerium for bismuth, iron, chromium, zirconium and cerium. As for magnesium, manganese, nickel and cobalt, it is also convenient to use nitrates thereof. These are dissolved in water and amount of the solutions is adjusted to obtain impregnating solutions.

In impregnation, the pore volume of the deteriorated catalyst is previously measured, and an impregnating solution in an amount of 80–110%, preferably 90–98% of the pore volume is prepared in which are dissolved a given amount of a starting compound for molybdenum and a given amount of a starting compound for the B component or, if necessary, a starting compounds for the A and/or C components. Then, the solution was pored to the deteriorated catalyst, followed by well mixing. After completion of the impregnation, the catalyst is dried and calcined.

The calcination is carried out preferably under movement of the catalyst particles. For calcination it is suitable to employ a rotary calciner, a fluidized bed calciner, etc. If the catalyst is calcined with being fixed, it sets and results in inconvenience for use as a fluidized bed catalyst or its activity is not sufficiently developed. Especially preferably, a fluidized bed calciner which can more severely perform the control of calcination temperature is used at the final firing.

Atmosphere in calcining is usually air, but in addition there may be used inert gases such as nitrogen, carbon dioxide and water vapor or reducing gases such as various oxygen-containing gases containing ammonia, organic compounds or the like.

The present invention will be explained in more detail and specifically by the following examples and comparative examples.

EXAMPLE 1

Fifty kilograms of a catalyst having a composition of $Mo_{10}Bi_{0.8}Fe_{4.4}Sb_{4.2}Ni_{6.5}P_{0.5}B_{0.3}Te_{0.25}K_{0.7}O_{55.4}$ $(SiO_2)_{40}$ was packed in a fluidized bed reactor of 8 inches in inner diameter, and when ammoxidation reaction of propylene was carried out for a long period of time, yield of acrylonitrile decreased. Pore volume of this deteriorated catalyst was measured by water titration method to obtain 0.22 ml/g. To 1,940 g of the deteriorated catalyst was poured an impregnating solution (mentioned hereinafter) containing molybdenum, chromium and zirconium components at a ratio of $Mo_1Cr_{0.2}Zr_{0.1}$ (atomic ratio) in an amount of 410 ml which corresponded to 96% of the pore volume, followed by well mixing by a V-shaped blender. As a result, the deteriorated catalyst was impregnated with molybdenum in a proportion of 1 (atomic ratio) to 10 of molybdenum in the deteriorated catalyst. The catalyst after impregnated was put in a ceramic container, dried at 250° C. for 2 hours by a dryer, then calcined at 400° C. for 2 hours in a box-type electric furnace, and finally calcined at 570° C. for 3 hours in a fluidized bed calciner under fluidization with air. The resulting catalyst was subjected to the activity test referred to hereinafter.

The impregnating solution was prepared in the following manner.

Eighty-six grams of aqueous hydrogen peroxide was added to 130 g of pure water, and 61.4 g of ammonium paramolybdate was dissolved therein (solution A).

One hundred and twenty-eight grams of 63% nitric acid was added to 95 g of pure water, and 27.8 g of chromium nitrate and 9.3 g of zirconium oxynitrate were dissolved therein (solution B).

The solution B was added to the solution A with stirring.

EXAMPLE 2

The deteriorated catalyst was impregnated with molybdenum and iron in the same manner as in Example 1, except that the impregnating components were molybdenum and iron. Iron nitrate was used as a starting material for the iron component, and the final calcination was carried out at 565° C. for 3 hours. The resulting catalyst was subjected to the activity test referred to hereinafter.

EXAMPLE 3

The deteriorated catalyst was impregnated with molybdenum, iron, chromium, lanthanum and vanadium in the same manner as in Example 1, except that these elements were used as the impregnating components. Lanthanum nitrate was used as a starting material for the lanthanum component, and the final calcination was carried out at 565° C. for 3 hours. The resulting catalyst was subjected to the activity test referred to hereinafter.

EXAMPLE 4

The deteriorated catalyst was impregnated with molybdenum, bismuth, tellurium and magnesium in the same manner as in Example 1, except that these elements were used as the impregnating components. Bismuth nitrate was used as a starting material for the bismuth component, telluric acid was used as a starting material for the tellurium component and magnesium nitrate was used as a starting material for the magnesium component, and the final calcination was carried out at 560° C. for 3 hours. The resulting catalyst was subjected to the activity test referred to hereinafter.

EXAMPLE 5

The deteriorated catalyst was impregnated with molybdenum, iron, chromium, cerium and tungsten in the same manner as in Example 1, except that these elements were used as the impregnating components. Cerium nitrate was used as a starting material for the cerium component and ammonium paratungstate was used as a starting material for the tungsten component, and the final calcination was carried out at 570° C. for 3 hours. The resulting catalyst was subjected to the activity test referred to hereinafter.

EXAMPLE 6

The deteriorated catalyst was impregnated with molybdenum, iron, chromium, zirconium and manganese in the same manner as in Example 1, except that these elements were used as the impregnating components. Manganese nitrate was used as a starting material for the manganese component, and the final calcination was carried out at 570° C. for 3 hours. The resulting catalyst was subjected to the activity test referred to hereinafter.

EXAMPLE 7

The deteriorated catalyst was impregnated with molybdenum, iron, chromium and zirconium in the same manner as in Example 1, except that these elements were used as the impregnating components. The final calcination was carried out at 570° C. The resulting catalyst was subjected to the activity test referred to hereinafter.

EXAMPLE 8

The deteriorated catalyst was impregnated with molybdenum, phosphorus, tellurium, iron, chromium, zirconium, nickel and cobalt in the same manner as in Example 1, except that these elements were used as the impregnating components. Orthophosphoric acid was used as a starting material for the phosphorus component, and nitrates of nickel and cobalt were used as starting materials for nickel and cobalt components, respectively, and the final calcination was carried out at 565° C. for 3 hours. The resulting catalyst was subjected to the activity test referred to hereinafter.

EXAMPLE 9

The deteriorated catalyst was impregnated with molybdenum, iron, chromium, zirconium and lanthanum in the same manner as in Example 1, except that these elements were used as the impregnating components. The final calcination was carried out at 570° C. for 3 hours. The resulting catalyst was subjected to the activity test referred to hereinafter.

EXAMPLE 10

The deteriorated catalyst was impregnated with molybdenum, boron and iron in the same manner as in Example 1, except that the impregnating components were these elements. Boric acid was used as a starting material for the boron component, and the final calcination was carried out at 570° C. for 3 hours. The resulting catalyst was subjected to the activity test referred to hereinafter.

Comparative Example 1

The catalyst deteriorated due to the long-term ammoxidation reaction of propylene was subjected to the activity test referred to hereinafter.

Comparative Example 2

Two kilograms of the deteriorated catalyst of Comparative Example 1 was fired at 565° C. for 3 hours in a fluidized bed calciner under fluidization with air. The resulting catalyst was subjected to the activity test referred to hereinafter.

Comparative Example 3

The catalyst before used for the long-term reaction in Example 1 was subjected to the activity test referred to hereinafter.

Comparative Example 4

The regeneration treatment was carried out in the same manner as in Example 1, except that the molybdenum component was not added. The resulting catalyst was subjected to the activity test referred to hereinafter.

Comparative Example 5

The regeneration treatment was carried out in the same manner as in Example 1, except that the chromium and zirconium components were not added. The resulting catalyst was subjected to the activity test referred to hereinafter.

Activity Test

Activity test was conducted on the catalysts of the above examples and comparative examples. The activity test was conducted in the following manner by way of example of ammoxidation of propylene.

The catalyst was packed in a fluidized bed type reactor of 400 mm in height and 25 mm in inner diameter of catalyst fluidization part, and a mixed gas having the composition of propylene/ammonia/air/water vapor=1/1.2/10/0.5 (molar ratio) was supplied into the reactor at a gas linear speed of 4.5 cm/sec. The reaction pressure was 200 KPa.

Catalytic time, yield of acrylonitrile, selectivity and conversion of propylene are defined as follows.

Catalytic time (sec)=volume (ml) of catalyst based on apparent bulk density/flow rate (ml/sec) of gas calculated in terms of reaction conditions.

Yield of acrylonitrile (%)=the number of mols of the produced acrylonitrile/the number of mols of the supplied propylene×100.

Selectivity of acrylonitrile (%)=the number of mols of the produced acrylonitrile/the number of mols of the reacted propylene×100.

Conversion of propylene (%)=the number of mols of the reacted propylene/the number of mols of the supplied propylene×100.

Results of the activity test are shown in Table 1.

TABLE 1

| | Impregnating component (Atomic ratio in the case of Mo being 1) | | | Impregnation amount of Mo *1 | Final calcination temperature (° C.) | Apparent bulk density (g/ml) | Reaction conditions | | Results of reaction | |
|---|---|---|---|---|---|---|---|---|---|---|
| | A | B | C | Other component | | | | Reaction temperature (° C.) | Catalytic time (sec) | Yield of AN[1] (%) | Conversion of C3[2] (%) |
| Exam. 1 | — | Cr0.2Zr0.1 | — | — | 1 | 570 | 1.05 | 440 | 2.25 | 84.5 | 98.3 |
| 2 | — | Fe0.2 | — | — | 0.6 | 565 | 1.03 | 440 | 2.50 | 82.3 | 98.0 |
| 3 | — | Fe0.1Cr0.2La0.1 | — | V0.05 | 1.5 | 570 | 1.07 | 440 | 2.00 | 84.3 | 98.7 |
| 4 | Bi0.2Te0.2 | Fe0.2 | Mg0.05 | — | 1 | 560 | 1.04 | 440 | 2.50 | 82.5 | 97.7 |
| 5 | — | Fe0.1Cr0.1Ce0.05 | — | W0.05 | 1 | 570 | 1.05 | 440 | 2.25 | 83.8 | 98.7 |
| 6 | — | Fe0.1Cr0.4Zr0.1 | Mn0.1 | — | 0.6 | 570 | 1.04 | 440 | 2.25 | 83.1 | 98.0 |
| 7 | — | Fe0.05Cr0.2Zr0.1 | — | — | 0.5 | 570 | 1.04 | 440 | 2.25 | 83.0 | 98.2 |
| 8 | P0.1Te0.1 | Fe0.1Cr0.2Zr0.1 | N0.1Co0.1 | — | 2 | 565 | 1.07 | 440 | 2.00 | 83.5 | 98.1 |
| 9 | — | Fe0.1Cr0.3Zr0.1La0.1 | — | — | 1.5 | 570 | 1.06 | 440 | 2.00 | 83.6 | 98.2 |
| 10 | B0.1 | Fe0.2 | — | — | 1.5 | 570 | 1.05 | 440 | 2.00 | 82.5 | 98.2 |
| Com. 1 | Deteriorated catalyst | | | | — | — | 1.03 | 440 | 3.50 | 78.5 | 98.1 |
| Exam. 2 | Deteriorated catalyst calcined in the air | | | | — | 570 | 1.02 | 440 | 3.25 | 80.5 | 98.0 |
| 3 | Fresh catalyst | | | | — | — | 1.03 | 440 | 2.50 | 81.7 | 98.3 |
| 4 | — | Cr0.2Zr0.1 | — | — | — | 570 | 1.03 | 440 | 3.00 | 79.6 | 98.2 |
| 5 | — | — | — | — | 1 | 570 | 1.04 | 440 | 2.75 | 81.0 | 98.5 |

Note)
[1]AN: Acrylonitrile
[2]C3: Propylene

Industrial Applicability

Regeneration of deteriorated molybdenum-containing oxide fluidized bed catalysts can be performed effectively by the method of the present invention. The regenerated catalysts show no deterioration of physical properties, and, besides, can bring about the reaction results superior to those obtained by fresh catalysts.

What is claimed is:

1. A method for regeneration of a molybdenum-containing oxide fluidized bed catalyst which comprises impregnating a fluidized bed catalyst of a metal oxide containing molybdenum, bismuth and iron which has been deteriorated due to being used for a reaction in production of acrylonitrile by ammoxidation of propylene, with a solution of a molybdenum compound and a solution of at least one compound containing at least one element selected from the group consisting of iron, chromium, lanthanum and cerium which are prepared separately or with a previously prepared mixed solution of the above compounds; drying the resulting catalyst; and then, firing the catalyst at a temperature of 500–700° C.

2. A method for regeneration of a molybdenum-containing oxide fluidized bed catalyst which comprises impregnating a fluidized bed catalyst of a metal oxide containing molybdenum, bismuth and iron which has been deteriorated due to being used for a reaction in production of acrylonitrile by ammoxidation of propylene, with a solution of a molybdenum compound and a solution of at least one compound containing at least one element selected from the group consisting of iron, chromium, lanthanum and cerium which are prepared separately or with a previously prepared mixed solution of the above compounds; drying the resulting catalyst and; then, firing the catalyst at a temperature of 500–700° C., with a proviso that the composition of the elements in atomic ratio which are contained in said solution to be used in said impregnating is $Mo_1A_aB_bC_c$ wherein A is at least one element selected from the group consisting of phosphorus, boron, tellurium and bismuth; B is at least one element selected from the group consisting of iron, chromium, zirconium, lanthanum and cerium; and C is at least one element selected from the group consisting of magnesium, manganese, nickel and cobalt; a=0–1, b=0.03–1 and c=0–1, and molybdenum to be impregnated is 0.01–2 in atomic ratio when molybdenum in the catalyst is assumed to be 10 in atomic ratio.

3. A method according to claim 1 or 2, wherein peroxymolybdic acid or a salt thereof is used as the molybdenum compound.

4. A method according to claim 1 or 2, wherein a final firing is carried out using a fluidization firing kiln.

5. A method according to any one of claims 1–4, wherein the molybdenum-containing oxide fluidized bed catalyst has the following composition:

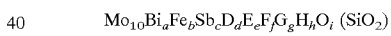
$$Mo_{10}Bi_aFe_bSb_cD_dE_eF_fG_gH_hO_i (SiO_2)_j$$

wherein Mo, Bi, Fe and Sb represent molybdenum, bismuth, iron and antimony, respectively, D represents at least one element selected from the group consisting of magnesium, calcium, strontium, barium, chromium, manganese, cobalt, nickel and zinc, E represents at least one element selected from the group consisting of copper, silver, cadmium, aluminum, gallium, indium, germanium, tin, lead, titanium, zirconium and hafnium, F represents at least one element selected from the group consisting of vanadium, niobium, tantalum, tungsten, yttrium, lanthanum, cerium, praseodymium, neodymium, samarium, europium, gadolinium, thorium, uranium, rhenium, ruthenium, osmium, rhodium, iridium, palladium, platinum and gold, G represents at least one element selected from the group consisting of phosphorus, boron and tellurium, H represents at least one element selected from the group consisting of lithium, sodium, potassium, rubidium and cesium, O represents oxygen and Si represents silicon, the suffixes a, b, c, d, e, f, g, h, i and j represent an atomic ratio, wherein a=0.1–5, b=0.1–15, c=0–20, d=0–10, e=0–10, f=0–10, g=0–5, h=0–3, i is the number of oxygen corresponding to an oxide produced by bonding of the above respective components, and j=20–150.

* * * * *